United States Patent [19]

Stossel

[11] 4,076,540
[45] Feb. 28, 1978

[54] FIRE EXTINGUISHING COMPOSITION

[76] Inventor: Ernest Stossel, 203 W. 81st St., New York, N.Y. 10024

[21] Appl. No.: 748,724

[22] Filed: Dec. 9, 1976

[51] Int. Cl.$^2$ .......................... C09D 5/18; A62D 1/00
[52] U.S. Cl. ..................................... 106/15 FP; 252/2;
252/5; 427/288; 427/439; 428/532; 428/921
[58] Field of Search .................... 106/15 FP; 252/2, 5;
427/288, 439; 428/532, 921

[56] References Cited

U.S. PATENT DOCUMENTS

| 3,719,515 | 3/1973 | Degginger | 252/2 X |
|---|---|---|---|
| 3,775,315 | 11/1973 | Smith et al. | 252/2 X |
| 3,988,266 | 10/1976 | Roth | 252/5 X |

FOREIGN PATENT DOCUMENTS 1,367,103   9/1974   United Kingdom ..................... 252/5

*Primary Examiner*—Leland A. Sebastian
*Attorney, Agent, or Firm*—Otto S. Kauder

[57] ABSTRACT

A fire extinguishing composition is disclosed comprising three essential ingredients that reinforce cooperatively the action of each ingredient when applied to an object on fire, (A) an ionic complex containing in an anionic portion thereof complexed nitrogen, phosphorus, oxygen, and aluminum, (B) a boric acid compound such as orthoboric acid, metaboric acid, or boric anhydride, and (C) urea. Flammable objects, particularly objects made of cellulose, are reduced in flammability by being pretreated with the composition disclosed. A new process for preparing the ionic complex ingredient of the fire extinguishing composition is also disclosed.

17 Claims, No Drawings

FIRE EXTINGUISHING COMPOSITION

BACKGROUND OF THE INVENTION

This invention relates to anionic complex containing nitrogen, phosphorus, oxygen, and aluminum in the anion, to a new process for the manufacture thereof, and to fire extingishing compositions containing such complexes.

Much of the knowledge gained in the age-long struggle to minimize the devastating effects of fire can be summed up by recalling that fire is extinguished by chilling a combustible material to a temperature below the necessary for the combustion chain reaction to be sustained, and by interfering with the access of oxygen to the combustible material. Water, the nearly universal extinguishing agent, works by way of both of these effects.

The classic soda and acid fire extinguisher and many of the aqueous foam delivery systems that have been developed intensify the smothering or oxygen access blocking effect of a non-combustible gas such as nitrogen, carbon dioxide, and steam while sacrificing some of the chilling effect owing to the diminished mass of water being projected at the burning material.

There have been attempts to increase the efficiency of water as an extinguishing agent by increasing its wetting power. "Wetter water", which is water containing dissolved surface-active materials, is more efficient on an equal weight or volume basis than water alone; it is, however, more viscous than pure water and therefore the advantage of greater fire extinguishing efficiency of a given quantity of water is counterbalanced by the diminished volume of "wetter water" actually delivered on burning material in a given time by given equipment, as well as by the need to have a specially prepared composition ready for instant use. With this come additional problems such as the increased tendency to corrode metals by surface active agent solutions which can lead to blocked valves and nozzles and failures of the system to deliver extinquishing liquid when needed. Furthermore, to the extent that the additives are compounds of hydrogen and carbon, fuel is actually being fed into the fire by such extinguishing material. A recent example of this approach to extinguishing fire with water and surface active material is disclosed in A. Globus U.S. Pat. No 3,979,302 of Sept. 7, 1976. The additive is a poly(complex) of a hydrated condensation reaction of a mono- or dialkanolamine with a higher fatty acid. There have been many materials disclosed that while chemically dissimilar work in a similar way, so that a detailed listing of individual disclosures can be omitted for brevity's sake.

Non-aqueous fire extinguishing agents are also known. Sand and a variety of "dry chemical" solids function by smothering a fire, sometimes reinforcing this effect by releasing a non-combustible gas, such as carbon dioxide from sodium bicarbonate or ammonia from diammonium phosphate. While nearly any non-combustible anhydrous fluid can at least temporarily extinguish a fire, the choice in practice is limited to compressed carbon dioxide and relatively few others. The high degree of toxicity of carbon tetrachloride and its combustion product phosgene has caused the use of carbon tetrachloride fire extinguishers to be abandoned and the use of other halogenated organic compounds to be under suspicion or restricted.

A recent disclosure of a non-aqueous fire extinguishing composition is by H. Filter in U.S. Pat. No. 3,972,820 of Aug. 3, 1976. Filter's composition can be considered a kind of projectile in which the material that actually extinguishes a fire represents 25 to 85 weight percent of the composition, preferably 35 to 60 weight percent, and is a halogenated organic compound, while the remainder of the composition is a combination of an oxidizer and a binder, with optionally a curing catalyst. In the heat of a fire the ingredients are caused to interact to generate vapors of the halogen compound under pressure and direct these at the fire, in order to extinguish it.

Anhydrous fire extinguishing compositions that do not require halogen compounds include urea melted and mixed with sodium, potassium, or ammonium carbonate, bicarbonate, or other salts at 130°–150° C under pressure, cooled, and powdered for use as a dry chemical extinguisher or a fire preventing coating, by J. Birchall in U.S. Pat. No. 3,484,372 of Dec. 16, 1969. Dry chemical extinguishers also complement high-expansion foams in fighting liquified natural gas fires according to L. Brown in Chemical Abstracts volume 83 (1975), 208187n.

For a more extensive review of the art of extinguishing fires, the prior art references cited by Filter and the article by C. Babcock in "Kirk-Othmer Encyclopedia of Chemical Technology" second edition (A. Standen, executive editor; Wiley-Interscience, New York 1966) volume 9, pages 286–299 can be consulted.

To minimize fire damage, many attempts have been made to diminish the flammability of various useful material by including in or with them substances capable of extinguishing a fire if it should occur. Such substances can be termed fires retardant or fire preventing agent or compositions, and their use cutomarily accompanies the use of combustible natural and synthetic polymers such as wood, paper, cotton, and other useful forms of cellulose; polyamid and polyester synthetic fibers and cloth manufactured therefrom; rubber, polyurethane, and plasticized polyvinyl chloride foams; ethylene, propylene, butylene, and styrene polymer plastics and fibers, and the like.

A useful fire preventing composition must be affect the useful properites of articles treated therewith as little as possible. This reasonable and plausible requirement is actually quite difficult to satisfy since in the most useful combustible materials quite large quantities of the conventional fire preventing compositions must be used to accomplish the desired protection, and this inevitably changes the overall composition and therefore the properties of the treated items. Thus fabrics tend to be stiffened, foams to be made less resillient, and plastics to be discolored as a result of the incorporation of conventional fire preventing compositions in the required concentrations, and even where these primary properties are acceptable, other properties such as odor, toxicity, and cost are sometimes adversely affected. The art of fire prevention in useful materials by the use of added fire preventing compositions has been reviewed by R. Hindersinn in "Encyclopedia of Polymer Science and Technology" (N. Bikales, executive editor, Wiley-Interscience, New York 1967) volume 6 pages 1–64, and for textiles by B. Drake, Jr. in "Kirk-Othmer Encyclopedia", second edition, volume 9, pages 300–315.

Representative disclosures of fire preventing compositions applied to wood include the use of urea-formaldehyde resin with boric acid or a borate salt by H.

Chase in U.S. Pat. No. 3,438,847 of Apr. 15, 1969; phosphoric acid with diammonium phosphate or with urea and dicyandiamide to a recommeded 3% P content for protecting wood fiberboard, by A. Leonovich et al in articles abstracted in Chemical Abstracts volume 70 (1969) 79310c, volume 71 (1969) 31561d, and volume 74 (1971) 32834a; hardboard treated with ammonium phosphate, bromide, or sulfamate, guanidine phosphate, or borax and boric acid, by I. Hirato in Chemical Abstracts volume 70 (1969), 12779u; borax and boric acid mixed with ammonium phosphate and sodium pentachlorophenate by T. C. Hsieh in Chemical Abstracts volume 73 (1970) 132172z; sodium or ammonium bromide to a 6 to 7.5% by weight of dry wood add-on along with urea-formaldehyde or any of ammonium phosphate, sulfate or sulfamate or sodium phosphate or boric acid by M. Lewin in Israeli U.S. Pat. No. 27,503 of Sept. 17, 1970; borax and urea with a water soluble vinyl alcohol polymer and a polyhdric alcohol by E. Degginger in U.S. Pat. No. 3,537,873 of Nov. 3, 1970; any one or more of ammonium phosphate, boric acid, borax, and urea with an inert water-resistant coating for wood boards pressed from wood pulp by Stlftelsen Wallboards Industriens Forkningsinstitut in British Pat. No. 1,242, 290 of Aug. 11, 1971; 5 to 50% by weight reaction products of boric acid with a nitrogen compound such as urea, thiourea, or dicyandiamide at 60°–155° C in molar ratios from 1 to 0.5 to 1 to 3 by K. Kawakami in Japanese Pat. 73/23399 of July 13, 1973; borax and urea-formaldehyde resin in flame-resistant particleboard by D. Cartlidge in U.S. Pat. No. 3,873,662 of Mar. 25, 1975; sodium polyborate at 3 to 13% by weight in fire resistant particleboard along with dicyandiamide or malamine and formaldehyde by L. Surdyk in U.S. Pat. No. 3,874,990 of Apr. 1, 1975; and aqueous solutions of partially reacted monomethyloldicyandiamide, melamine, and phosphoric acid with molar ratios monomethyloldicyandiamide to melamine from about 11.5 to 1 to about 3 to 1, and phosphoric acid to the two nitrogen compounds together from about 1 to 1 to about 1.5 by W. Oberly in U.S. Pat. No. 3,986,881 of Oct. 19, 1976.

Representative disclosures of fire preventing compositions applied to paper include an impregnating bath containing an acrylic resin, ammonium bromide, and urea or dicyandiamide disclosed by W. Mayer in U.S. Pat. No. 3,667,999 of June 6, 1972; corrugated paperboards impregnated with boric acid and aluminum sulfate adhered to foamed polystyrene by Y. Kimura in Japanese Kokai 75/79,586 of June 28, 1975; and the impregnation of unsized paper of 62 grams per square meter weight with an aqueous solution of starch, urea, and ammonium phosphate to a weight of 80 grams per square meter or a 22.5% dry add on, by J. Sheen in German published application 2,404,790 of Aug. 14, 1975.

Representative disclosures of fire preventing compositions applied to plastic and elastomer foams include kaolin or a mixture of urea and sodium silicofluoride to make an acetone-formaldehyde resin foam fire-resistant by T. Waag in British Pat. No. 1,158,698; mixtures of urea with thiourea or ammonium thiocyanate to protect polyvinyl alcohol foam by B. Lawes in U.S. Pat. No. 3,481,886 of Dec. 2, 1969; synthetic resin foams of polyvinyl chloride or polyethylene with boric oxide or borates. aluminum oxide and/or phosphate, and optionally chromic anhydride, pearlite, or ammonium phosphate, by J. Kimura in Japanese Kokais 75/86561, 86562, and 86563 of July 11, 1975; boric acid along with melamine and alumina hydrate in hydrophilic polyurethane foam by C. Kehr in U.S. Pat. No. 3,897,372 of July 29, 1975.

Representative disclosures in the field of fire preventing compositions applied to textiles and fabrics include the application of a amido compounds of cyanuric acid as salts of phosphoric acid, pyrohposphoric acid, or oxalic acid by F. Pollak in U.S. Pat. No. 2,418,525 of Apr. 8, 1947. Pollak's preferred amido compound is melamine. The textiles and fabrics are first impregnated with the acid and afterwards passed through a melamine bath, which forms an insoluble precipitate that strongly adheres to the fibers but can be removed by washing or similar water treatment. To diminish this water solubility the textiles and fabrics are treated or coated with a urea or thiourea condensation product with formaldehyde or mixtures thereof, and dried at 120°–140° C. Boric acid and dichlorodhydrin can be included to assist with the formation of the resinous condensation product. F. Ford in U.S. Pat. Nos. 2,482,755 and 2,482,756 of Sept. 27, 1949 disclosed treatment of a cellulosic textile with a strong acid, such as phosphoric acid; a soluble organic nitrogen containing base, such as urea, dicyandiamide guanidine carbonate, and aminoguanidine carbonate to act as a buffer and diminish tenderizing of the cellulose by the acid; formaldehyde or similar agent to combine with the organic nitrogen compound and the cellulose and thereby introduce more nitrogen into the compound or compounds produced on heat curing, with consequent increase in buffering action; and a volatile base such as ammonium hydroxide, dimethylamine or ethylenediamine, whose function is to stabilize the treatment solution against undesirable interactions of its components during use and subsequently volatilize to permit the acidic conditions that promote cure to develop on the fabric. With sufficient add-on of Ford's composition to the fabric and a sufficiently vigorous cure, fabric with good flame resistance that is maintained through a hot water washing or soaping operation is obtained. The required add-on is of the order of 100% wet pick up of a solution containing 30% by weight active ingredients.

Ford's composition and method with elaborations and variations in detail has remained popular, as shown by many subsequent disclosures. Thus K. Katsuura in Chemical Abstracts volume 67 (1967) 55078v disclosed a variant of the pad and and cure process with urea and phosphoric acid as flameproofing treatment for cotton fabrics whereby an organic solvent is used. Similarly, A. Benarous in French Patent 1,462,192 of Dec. 16, 1966 disclosed a variant where methylclorocorm solvent is used in a treatment with a fire preventing mixture consisting of urea, ammonium borate and bromide, phosphoric acid, ammonium hydroxide, tricresyl phosphate and emulsifier. L. Teodorescu in Romanian Patent 51,226 of Aug. 17, 1968 disclosed an emulsification method to combine the diammonium phosphate + urea system with the organic halogen compound (chlorinated paraffin and polyvinyl chloride) + antimony oxide system. D. Zyzka in Polish Patent 56,436 of Feb. 25, 1969 disclosed cotton treated by an impregnating bath of monosodium acid phosphate, urea, and a formaldehyde-melamine or formaldehyde-urea condensation product, followed by drying above 150° C and then treating with aqueous ammonium chloride. R. LeBlanc in U.S. Pat. No. 3,899,483 of Aug. 12, 1975 disclosed a special aftertreatment with heavy metal and transition metal salts, especially titanium chlorides, of textiles which had been treated with organic or inorganic phosphorus compound fire preventing agents. The aftertreatment with the metal salt minimizes the loss in fire preventing ability caused in treated materials by ion exchange with the so-called hard water ions, particularly calcium and magnesium, and thereby increases the wash resistance of the fire preventing effect of the treated fabric.

Another important fire preventing composition and method that has gained a certain acceptance for treating cotton fabrics uses tetrakis(hydroxymethyl) phosphonium chloride (abbreviated THPC) as the key chemical ingredient as disclosed by J. Guthrie et al in "American Dystuff Reporter" volume 44 No. 10 of May 9, 1955 pages P328 to P332, and U.S. Pat. No. 2,772,188 Nov. 27, 1956. In the processing of cotton fabrics, THPC is mixed with triethanolamine, methylolmelamine, and urea in aqueous solution. The solution is applied to fabric with a padder. The fabric is then dried at a relatively low temperature, for example 80°–90° C., and cured at an elevated temperature such as 135°–150° C, and finally washed and given a softening treatment. With a dry weight add-on of 16.6%, fabric passes the standard vertical flame test but with some afterflame, especially along cut edges and a 20% add-on is recommended by the authors for the fabric to show little or no afterflame when tested with a match. In subsequent elaborations and variants of this system, J. Beninate et al described a pad-dry-cure process for cotton fabrics using tetrakis(hydroxymethyl) phosphonium hydroxide together with urea and trimethylolamine (see Textile Research Journal volume 38 (1968), pages 267–272). R. Cole in German published application 2,009,121 of Jan. 28, 1971 applied the THPC-urea-trimethylolmelamine composition to wool at pH 4 to 5. J. Dipietro et al in Textile Research Journal volume 41 (1971) pages 593–599 compared the THPCurea-trimethylolmelamine composition to tris(2,3-dibromopropyl) phosphate, finding the former effective on cotton but ineffective on polyester and polyester-cotton blends while dibromopropyl phosphate was effective on both kinds of fabric. B. Aycock in U.S. Pat. No. 3,765,837 of Oct. 16, 1973 disclosed a combination of THPC with an allylurea compound for padding on polyester-cotton blend textile and subsequent bromination by soaking in a chloroform solution of bromine. Aycock's dry weight add-on was 21% before bromination. T. Tanisho in Japenese Kokai 75/63299 of May 29, 1975 disclosed a reaction product of THPC with urea and sodium hydroxide used to fireproof fabrics of polyvinyl alcohol in combination with phosphoric acid. D. Donaldson disclosed the addition of polyvinyl bromide to the THPC urea system to impart excellent flame resistance to 50–50 polyester-cotton blends, see Fire Retardant Chemicals, volume 2 No. 2 supplement (1975), pages 102–109. E. Stossel in U. S. Pat. No. 3,414,374 of Dec. 3, 1968 has disclosed neutral water soluble or colloidally soluble ionic complexes having phosphorus, oxygen, nitrogen and aluminum and/or chromium in an anionic portion of the molecule. The complexes are assigned the empirical formula

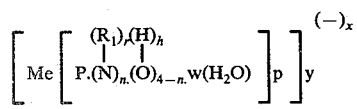

In this formula, $R_1$ is hydrogen, or an organic radical having one to about thirty carbon atoms. Me is aluminum or chromium, alone, or in a mixture with each other, and/or with any metal other than the alkali or alkaline earth metals. Such additional metal is added in a minor proportion, in substitution for part of the aluminum, and/or chromium, which constitute the major proportion. $n$ is a number within the range from 0.1 to about 3, preferably from 0.25 to 2. $w$ is a number within the range of 0 to about 100, preferably 0.5 to 2. $p$ is at least equal to 1, preferably is above 3. Normally, $p$ is within the range from about (1.5 to about 100. $r$ is a number within the range from 1 to 2. $h$ is a number in the range from 0 to (4-$n$). $x$ is the valence to the anion, and will have a value determined by the preceding variables. It is always negative, and is in no way critical. The value of $y$ is at least 1 and can range up to 20,000 or higher and is also not critical.

The complexes are described as resinous materials soluble in an equal volume of water. When applied to paper or wood they dry rapidly to form a glossy coating that does not embrittle during long service life and, when formed on cellulosic material, increase flame resistance. The complexes can be mixed with pigments and water to give concentrated dispersions useful as fire retardant paints. The complexes described in this patent are prepared by the reaction of concentrated solution of an aluminum or chromium acid phosphate with a compound having at least one -$NHR_2$ group, where $R_2$ is hydrogen or an organic radical or a phosphoro-oxygen radial. The simplest -$NHR_2$ compound is ammonia. A special and preferred technique permits the reaction to be carried out simply and at atmospheric pressure if the volatile amine compound (e.g. ammonia) is formed during the reaction from a non-volatile compound (e.g. urea) which decomposes to yield the volatile amine compound under the reaction conditions. It is particularly desirable for some uses if the second product resulting from this decomposition is a gas. The disclosure of U.S. Pat. No. 3,414,374 also includes the reaction of phosphoric acid with a minor amount of boric acid to form a soft jelly which is then carried through the remaining steps of the process.

E. Stossel in U.S. Pat. No. 3,667,903 of June 6, 1972 has disclosed a foam polymerization process in which bubbles of foam being generated by the controlled decomposition of a blowing agent at a suitable temperature, for example urea in the range of 150° to 225° C, function of pressure vessels, of which the polymer forming reactants consitute the walls, thereby facilitating the transfer of heat, reacting materials, and volatile by-products into and out of the reacting mass. Stossel's foam polymerization process is well suited to the preparation of the ionic complexes disclosed in U.S. Pat. No. 3,414,374 when sufficient urea is used to act both as blowing agent for the foam polymerization and as reactant for the formation of the ionic complex.

E. Stossel in U.S. Pat. No. 3,945,987 of Mar. 23, 1976 has disclosed that concentrated solutions of acid aluminum phosphate can be neutralized with ammonia without precipitation when the viscous acid aluminum phosphate solution in water is mixed with substantially solid urea at a temperature not exceeding about 90° C. to form a "clathrate" or urea adduct. The adduct is produced when an aluminum phosphate solution in aqueous phosphoric acid is concentrated until a semi-plastic highly viscous solution is obtained which contains between 10 to 12% water. This highly viscous fluid is then cooled to below 90° C and, in a second step, intimately admixed with solid urea to form a urea adduct comples. Urea is added until a sample does not undergo precipitation when treated with concentrated ammonia. The urea inclusion complex is very fluid and contains about 7% of water. The fluid solution can be neutralized by ammonia gas to the required pH to form a mixture of the clathrate and ammonium phosphates.

The buffered, acid solution of the above described aluminum acid phosphate-urea clathrate and the neutralized mixture thereof with ammonium phosphates can be directly used for the impregnation of flammable materials as wood, paper, textiles, plastic foams, etc.

When the concentrated solution of the acid aluminum phosphate-urea clathrate is heated above a temperature of 150° C, a voluminous foam is formed which contains within its innumerable cells encapsulated carbon dioxide. Upon heating, the urea of the "host molecule" decomposes into carbon dioxide and ammonia, the latter reacting with the aluminum phosphate of the foam bubble skins.

SUMMARY OF THE INVENTION

In accordance with this invention, a fire extinguishing composition having enhanced efficiency and effectiveness as a result of the cooperating and mutual reinforcing interaction of the ingredients thereof comprises (A) an ionic complex containing in an anionic portion of the molecular complexed nitrogen, phosphorus, oxygen, and aluminum, and having a P:N molar ratio of 10:1 to 2:6, a P:Al molar ratio of 1:1 to 100:1, an acid number less than 400, and a pH in a 2% aqueous solution above 2.5; (B) a boric acid compound selected from the group consisting of orthoboric acid, metaboric acid, and boric anhydride, and (C) urea. The proportions of these ingredients in the composition of the invention are 30 to 80 parts by weight of the ionic complex, 3 to 4 parts by weight of boric acid compound, and 10 to 300 parts by weight of urea. The fire extinguishing composition of this invention can be used to douse fires as a "dry chemical" extinguisher or dissolved in water, and in either case can be admixed with additional fire extinguishing components such as sodium bicarbonate. The fire extinguishing composition can also be applied to objects such as structural members, building materials, paper, textiles, and fabrics made of cellulose, or other combustible polymers, which it is desired to protect from the destructive effect of fire; when so applied the compositions of this invention minimize the flammability of objects made of cellulose and other combustible polymeric materials without impairing of cellulose and other combustible polymeric materials without impairing the desirable properties or unduly increasing the cost thereof.

Also in accordance with this invention, an ionic part of the fire extinguishing composition is prepared by a process that comprises the steps of concentrating to at least 700 grams phosphoric acid (as $H_3PO_4$) per liter an aqueous solution containing per liter of solution 120 g to 400 g dissolved $H_3PO_4$ and 0.5 g to 30 g dissolved aluminum, adding per liter of concentrate 40 g to 1600 g urea, heating the resulting mixture at 150° to 240° C for 1 to 10000 seconds, and recovering the ionic complex. Within the molar ratios of P:N and P:Al of the ionic complex of this invention, when the nature and proportions of reactants are selected so as to bring these ratios within range of 4:1 to 2:4 for the molar ratio of P:N and 3:2 to 10:1 for the molar ratio of P:Al and to bring the pH of a 2% aqueous solution above 5, and ionic complex is obtained as a friable solid that is easily ground or subdivided and obtained in a light, fluffy condition of low apparent density not exceeding 450 grams per liter.

DESCRIPTION OF THE PREFERRED EMBODIMENTS

The ionic complex used in the fire extinguishing composition of this invention is a neutral water-soluble or colloidally soluble ionic complex having phosphorus, oxygen, nitrogen, and aluminum in an anionic portion of the molecule. The composition and properties of such anionic complexes are disclosed in E. Stossel U.S. Pat. No. 3,414,374 at column 3 line 52 to column 5 line 39, and this disclosure is here incorporated by reference. As indicated in this reference disclosure at column 4 lines 33 to 49, nitrogen within the anion of the ionic complex can be substituted by hydrogen or organic groups having from one to about thirty carbon atoms. In the fire extinguishing composition of this invention, nitrogen within the anion of the ionic complex is preferably substituted with hydrogen, hydroxymethyl, or hydroxyethyl groups. Two examples of possible structural formulae for ionic complexes that can be used in the fire extinguishing composition of this invention are as follows:

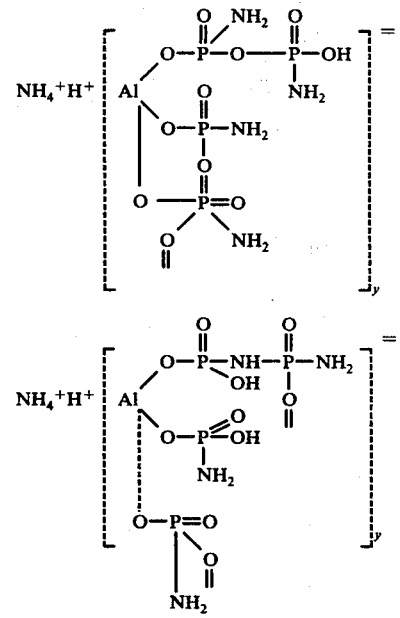

Oxygen atoms singly bound to phosphorus within the anion may be linked to the metal or to hydrogen, or may carry the negative charge associated with the anion. The placement of hydrogen atoms and negative charges on particular oxygen atoms is entirely arbitrary, as the various possible formulae represent limiting conditions of a system in dynamic equilibrium.

The ionic complex used in the fire extinguishing composition of this invention can be prepared as disclosed in U.S. Pat. No. 3,667,903 examples 5,6,8, and 12, and 3,414,374, column 6 line 26 to column 11 line 3, and these disclosures are here incorporated by reference. As indicated in the latter reference disclosure at column 6 lines 61 to 70, at some stage during the preparation of the complex it is essential to heat the reactants at a temperature above 150° and below the decomposition temperature of the reaction mixture, which ranges from 225° C to about 240° C depending on the time of heating.

As indicated in this reference disclosure, starting materials for the preparation of the ionic complex used in fire extinguishing compositions of this invention include aluminum compounds and ores disclosed at column 7 lines 56 to 72, forms of phosphoric acid disclosed at column 8 lines 4 to 24, and nitrogen compounds disclosed at column 8 line 26 to column 9 line 65. The preferred nitrogen compound is urea. Analytical tests have been devised to determine the molecular constitution of the ionic complex that can be used in fire extinguishing compositions according to this invention, and how whether nitrogen and metal atoms such as aluminum present in the complex are in anionic or cationic form or both, and how much of each form is present.

To ascertain anion nitrogen, ammonium (cationic) nitrogen outside the anion is first displaced and detected. The nitrogen not displaced in the test is bound in the anion, and the amount of anion nitrogen is therefore found by subtraction of ammonium nitrogen from total nitrogen.

The following standardized test for determination of ammonium nitrogen, as distinguished from ammonia obtained by hydrolysis of nitrogen present in the anion, is carried out by heating the complex in 2% aqueous KOH solution. A sample of the compound, approximately one gram, is dissolved in 200 cc. of 2% aqueous KOH, and heated at 95°-100° C while a stream of nitrogen is passed through a solution, then through a downward condenser and finally through a wash bottle containing 100 mls. of N/10 hydrochloric acid. In this way, ammonia liberated by hydrolysis with KOH is taken up in hydrochloric acid, and consumption of the hydrochloric acid is a measure of the amount of ammonia liberated. The contents of the wash bottle are sampled at 10 minute intervals, and the samples titrated to methyl red to determine the amount of absorbed ammonia by difference from the amount of starting hydrochloric acid. The end point is the point where the evolution of ammonia slows down appreciably, usually after about 30—40 minutes of heating with the KOH solution. If the heating is continued beyond this point, hydrolysis of the nitrogen present in the anionic portion of the complex may result in the formation of ammonia, thus destroying the accuracy of the test. Under the conditions set out, the ammonia bound as ammonium ion by the acid complex, and not the ammonia developed by hydrolysis of the nitrogen present in the anion, is the only ammonia determined. The nitrogen content of the anionic portion of the complex is then taken as the difference between the total nitrogen and the ammonia nitrogen detected in the test.

An alternative test used in some instances for determination of ammonium nitrogen as $NH_3$ following the Victor Method of Analysis of Victor Chemical Works, Issue No. 1, Ser. No. 55.0, June 4, 1953, is as follows:

A 0.5 g sample of the complex is weighed into a 500 ml Kjeldahl flask. 2 g of magnesium oxide, 200 ml of water, and 1 g of granular zinc is then added, and the flask connected to a condenser and heated. 100 ml of distillate is collected in 50 ml of N/5 HCl. The hydrochloric acid solution is then titrated with N/10 NaOH against methyl red as the indicator. The percent free ammonia is determined in accordance with the equation:

$$\% NH_3 \text{ (free)} = (100 - N/10 \text{ NaOH}) \times 0.34$$

To ascertain aluminum, chromium, and other metals as anion, test reagents for anionic and cationic metal are mixed into portions of a solution of the product to be tested.

The standardized test reagent used in the Examples for metal cation is ammonia. Aqueous 2% ammonium hydroxide about (2 cc.) or sufficient amount to render the solution of the complex salt alkaline, is added at room temperature to 5 cc of the 2% solution of the complex. Any $Al^{+++}$ ion present will form a precipitate. If no precipitate is formed, the test result will be reported as negative, meaning no Al ion is present in cationic form.

The standardized test reagent used in the Examples to detect metal-containing anions is 2% aqueous diisobutylphenoxyethoxy dimethylbenzylammonium chloride monohydrate, Hyamine 1622. 2 cc of this reagent is added to a 5 cc of 2% solution of the complex to which 0.5 cc of 2% orthophosphoric acid has previously been added. If only cations such as $Al^{+++}$ are present, no precipitate will form, and if only metal-free anions such as $OH^-$ or $PO_4^=$ are present, even in alkaline solution, no precipitate will form. However, a precipitate will form with any metal-containing anions present. Hence, formation of a precipitate indicates the presence of aluminum in the anion, and such formation as the test result is reported as positive.

The ionic complex used in the preferred fire extinguishing composition of this invention can also be prepared by a new process that is especially efficient and economical. Unexpectedly it has been determined that aqueous solutions containing per liter 40 g to 400 g dissolved phosphoric acid (as $H_3PO_4$) and 0.8 g to 30 g dissolved aluminum are excellent starting materials for the preparation of the ionic complex used in the preferred compositions. Such solutions occur as waste streams from the bright dipping of aluminum in the metal treating industry and, since antipollution legislation limits the discharge of such wastes into rivers and lakes, are available at lower prices than their separate ingredients. In addition, T. Korenowski (American Chemical Society Division of Industrial and Engineering Chemistry, paper no. 51, presented Apr. 7, 1976) has disclosed an ion exchange refining process that upgrades a bright dipping waste stream typically containing per liter 350 g phosphoric acid and 20 g aluminum to a raffinate containing per liter 300 g phosphoric acid and 2 g aluminum while providing an ultimate waste stream containing per liter 15 to 25 grams of dissolved aluminum and 80 to 160 grams phosphoric acid. Both the raffinate and ultimate waste streams from Korenowski's process as well as the original bright dipping waste acid can be used as available as starting materials in the process of this invention. If desired the P:Al ratio can be adjusted in either direction. Addition of an aluminum compound such as aluminum hydroxide, aluminum oxide (including bauxite and other aluminum ores), or aluminum phosphate, decreases the P:Al ratio, while allowing a predetermined amount of aluminum phosphate to precipitate and be filtered off during the concentration of the solution increases the P:Al ratio. In each instance the solution is concentrated, suitably by evaporation, until it contains at least 700 g $H_3PO_4$ per liter, filtered if necessary to remove insoluble materials treated with 40 to 1600 grams urea per liter of concentrate and if desired an acid resistant surfactant, and heated to a reaction temperature between 150° C and about 240° C preferably 190°–215° C for a reaction period of 1 to 10,000 seconds, preferably 30 to 1,000 seconds, to convert the viscous liquid reaction mixture to a friable easily ground solid. The addition of urea to the reaction mixture is conveniently carried out at 85° to 110° C; below this range the mixture is inconveniently viscous and above this range partial hydrolysis of urea can cause inconvenient premature foaming. The heating step above 150° C is suitably carried out in a thin layer. Agitation can be provided, as by heating the concentrated solution of the reactants between heated rollers or similar devices, but is not essential. The reaction can also take place without agitation, as in a heated chamber or microwave oven to and from which the reacting mixture is transported on a tray or belt either intermittently or continously.

The foamed reaction product gradually hardens as it is heated at 150° C and 240° C and eventually becomes friable, and can be ground into a powder. When the molar ratios of P:N and P:Al in the ionic complex according to this invention are within the preferred range of 4:1 to 2:4 for the molar ratio of P:N and 3:2 to 10:1 for the molar ratio of P:Al and the complex has an acid number below 200 and a pH in a 2% solution above 5, the complex is obtained in the form of a particularly light and fluffy powder with an apparent density (bulking value) not in excess of 450 grams per liter.

An acid resistant surface active agent can be added to the reacting mixture along with or immediately before the addition of urea. Very small amounts are sufficient, ranging from about 50 to about 5,000 mg per kg of reaction mixture. Suitable acid resistant surface active agents are disclosed in U.S. Pat. No. 3,414,374 at column 11 lines 21 to 66; this disclosure is here incorporated by reference.

To prepare the fire extinguishing compositions of this invention, an ionic complex of the class disclosed is blended with a boric acid compound such as orthoboric acid, metaboric acid ($HBO_2$), and boric anhydride ($B_2O_3$), and with urea. Simple conventional equipment can be used to prepare dry blends of the ingredients, such as ribbon blenders, cone blenders, and twin shell blenders. The ingredients can also be blended in aqueous solution, which as a result of the interaction between the ingredients is lower in viscosity and less likely to increase in viscosity or become gelled than a solution of only the ionic complex at the same water content. When applied to burning combustible material, the composition of the invention generates the non-combustible gases carbon dioxide, ammonia, and steam by way of pyrolytic reactions that are endothermic and thereby contribute to the chilling of the burning material to below the temperature of sustained combustion. The other products of pyrolysis of the fire extinguishing composition of the invention are finely divided aluminum phosphates and boron phosphates and complex carbon-nitrogen compounds such as ammelide and condensed ring triazines that act as reinforcements for burning structures and minimize access of oxygen as well as melting, dripping, and volatility that can contribute to the spread of a fire.

The fire extinguishing composition of this invention can be used in a preventive manner by being applied to normally combustible materials at any time during the manufacture and useful life thereof. A fire extinguishing composition of this invention used in this way is termed a fire preventing composition and a manufactured article treated with a fire preventing composition in accordance with this invention is termed a fire resistant article. Conventional techniques can be used in the manufacture of fire resistant articles by treatment with a fire preventing composition according to this invention. For example, a dry powder mixture of an ionic complex of this invention, urea, and metaboric acid can be blended with a conventional binder and wood chips prior to compression into a fire resistant particleboard. Cotton batting can be passed through a treating bath containing an aqueous solution of boric acid, urea, and ionic complex prepared according to this invention, and then squeezed between rollers and oven dried to give a fire resistant batting that can be stored for long periods of time in either dry or humid atmospheres without dusting or loss of the ability to pass the cigarette burning test for fire resistant mattresses. In the manufacture of polyurethane foam, a powdered fire preventing composition of the invention can be slurried in the "polyol" stream, for example tetrakis(hydroxypropyl)pentaerythritol, that is fed into a foam machine along with a second stream of catalyst, typically comprising a basic tertiary amine such as dimethylaminoethanol and triethylenediamine and a tin compound such as dibutyltin di-2-ethylhexanoate and stannous neodecanoate, and a third stream supplying a compound having a plurality of isocyanate groups, such as toluenediisocyanate, diphenylmethanediisocyanate, and their trimerization products also known as isocyanurates. A feature of the fire preventing compositions of this invention is their great solubility in water and low viscosity and neutral pH when so dissolved. This makes such solutions outstanding applications media for treating fibers, textiles, and fabrics. Applications media containing the fire preventing compositions are compatible with and can be made up to contain, along with the fire preventing composition, many conventional textile treating agents.

If desired, the feel or hand of a fire preventing composition applied to textiles and fabrics can be adjusted towards greater softness or lessened stiffness by including in the treatment of textiles and fabrics with these compositions the use of a small quantity of at least one hydroxyalkyl amine. The hydroxyalkylamine has at least one alcoholic hydroxyl group, one amino group, and two carbon atoms and can have up to about 12 carbon atoms, four alcoholic hydroxyl groups, and three amino groups. The hydroxyalkylamine can be a primary, secondary, or tertiary amine. Useful hydroxyalkyl amines include monoethanolamine, diethanolamine, triethanolamine, N,N-dimethylaminoethanol, N,N-diethylaminoethanol, tetrakis(2-hydroxyethyl)ethylene-diamine, N-hydroxyethylmorpholine, N,N'-dihydroxyethylpiperazine, and the hydroxyalkylamines disclosed by E. Stossel in U.S. Pat. No. 3,414,374 at Column 9 lines 29 to 53, which disclosure is here incorporated by reference.

The quantity of hydroxyalkylamine can be from about 0.5 to about 5% by weight of the composition of the invention, preferably from about 2% to about 10% by weight.

The durability of the fire preventing composition of the invention when applied to textiled and fabrics can be improved, and in addition in some cases coupled with a degree of crease-proofing and water-proofing, by including in the treatment of textiles and fabrics with these compositions the use of a polymerizable cross-linking agent, which aids in bonding the composition to the fibrous base and helps the treated textile and fabric to maintain the fire preventing property imparted by the composition of the invention through repeated washing and dry cleaning operations during its useful life.

The cross-linking agent can be admixed with the fire preventing composition and applied in a single treatment operation. The cross-linking agent can also be applied in a separate treatment before or after the treatment with the fire preventing composition according to the invention. By the term "cross-linking agent" is meant any polyfunctional chemical compound capable of resin-forming polymerization and of reaction with active hydrogen groups in either or both the fire-preventing composition and in the fibrous substrate. Xanthydrol having the formula:

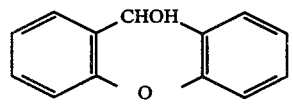

is an effective cross-linking agent. Also effective cross-linking agents are aldehydes and materials which liberate or contain aldehydes. Typical aldehydes are formaldehyde, paraformaldehyde, dialdehyde starch, dialdehyde cellulose, hexamethylene tetramine, acrolein, glycidaldehyde, methacrolein, glyoxal, hexanedial-1,3, and propanedial-1,3, and their open chain and cyclic acetals such as 1,3-dioxolane, meta-dioxane, spiroformal of pentaerythritol and triethylene glycol formal.

Also useful cross-linking agents are the epoxy resin-forming materials having in the molecule at least two 1,2-epoxy groups such as the polyglycidyl ethers of polyols, for example, diglycidyl ether of butanediol, triglycidyl ether of glycerol, tetraglycidyl ether of pentaerythritol, diglycidyl ether of Bisphenol A, diglycidyl ether of diphenolic acids such as 4,4-bis(p-hydroxyphenyl) valeric acid, vinyl cyclohexene dioxide, epoxidized rubbers, glycidyl methacrylate and its polymers and copolymers; also polymerizable phosphorus compounds such as tris(aziridinyl) phosphine oxide, tetra(hydroxymethyl) phosphonium chloride, and tris(hydroxymethyl) phosphine oxide.

Polymerizable phosphorus compounds have linked to phosphorus at least three polymerizable groups that can be alike or different and selected from the group consisting of hydroxymethyl, glycidyl, glycidyloxy, and ethylenimino.

Aldehyde-containing materials useful as cross-linking agents include aldehyde-amine resins in the water-dispersible stage of polymerization. Preferred materials of this type are prepared by reacting from 0.5 to 1 mole of aldehyde for each active NH- group on the amine. Specific examples include dimethylol urea, poly(oxymethyl) ureas, e.g., bis(methoxymethyl) uron (see U.S. Pat. No. 2,370,839); bis-(hydroxymethyl)-ethylene urea; tetra-(hydroxymethyl)-acetylene diurea; tetra-(methoxymethyl)-acetylene diurea; bis-(hydroxymethyl)-ethylene thiourea; bis-(methoxymethyl)-ethylene urea; 1,3-bis-(hydroxymethyl)-5-hydroxyethyl tetra-hydrotriazone (see U.S. Pat. No. 2,304,624); hexamethylol melamine; tri-(methoxymethyl)-melamine; polymethylol triazines, such as trimethylol acetoguanamine and tri-(methoxy methyl) benzoguanamine and water-soluble polymers thereof, including crude reaction products of commerce which contain the indicated monomers or polymers thereof.

The amount of cross-linking agent employed will depend upon the effect desired. Very small amounts may considerably improve the durability of the fire preventing finish. Larger amounts in proportion to the fire preventing composition may impart a crease-proofing effect. Excellent results have been obtained employing application media containing from 1 to 200% by weight of cross-linking agent based on the composition of the invention. There is no upper limit on the amount of cross-linking agent, but the composition of the invention will of course be present in a suitable amount to make the treated material capable of extinguishing a flame, in as much as this property is not imparted by the cross-linking agent.

Curing catalysts are not required to accelerate the rate of cure and ensure completion of the cure of the cross-linking agent, but can be included if desired. Catalysts for these curing agents are well known, and any such catalysts which are acidic or latently acidic can be used. Acidic and latently acidic salts such as ammonium salts and amine hydrohalide salts are typical.

The composition of this invention can be marketed as such for use in the preparation of application media, which are described in detail later. Such compositions can also be formulated with one or more cross-linking agents in the desired proportions for production of the application medium upon dilution with the dispersing liquid.

It is convenient in many cases to prepare such compositions in the form of concentrated solutions which are readily diluted with water or other solvents at the time of application. Such compositions are referred to herein as concentrates, inasmuch as they are ordinarily applied only after dilution at a considerably lower concentration of the active components.

In addition to these materials, the concentrates and/or application media of the invention may contain standard fibrous material treating adjuncts, including, for example, water-repellent and oil-repellent finishes such as the perfluorocarbon acid Werner complexes, including those disclosed in U.S. Pat. No. 2,662,835, and perfluoroacrylate polymers and copolymers, dyes, and pigments, textile lubricants, moth-proofing agents, shrink-proofing agents, brightening agents, sizes, paper-making chemicals such as wet strength resins for paper, mildew-proofing agents, leather treating agents, and softening agents. Materials in these groups are well known to those skilled in the art, and would be employed to obtain the special effect indicated by the function of the agent. Alternatively such materials can be applied to the fibrous material either before or after application of the compositions of this invention.

The application media in accordance with the invention can be applied to fibrous materials using conventional equipment. Standard impregnating, padding, and like treating apparatus can be employed. Usually, it is convenient to apply the compositions by dipping, padding or immersing. Brushing, spraying, roller coating, electrostatic coating, doctor-blade coating and like procedures can also be employed. The equipment will be set to give the desired weight of composition per unit area or volume of the base material. The wet pickup will, of course, be adjusted to take into account the concentration of solid materials in the application media. The concentration of the solids will in turn depend upon the viscosity required for the equipment used, and if necessary, viscosity increasing agents such as water-soluble cellulose ethers may be employed to limit impregnation of the fibrous base by the application medium. Usually, application media containing from 1 to 30% by weight of solid materials are employed, and the wet pickup is controlled to provide from about 5% to about 25% solids on the treated base material.

Following application of the composition, the base material may be dried to remove suspending liquids. If a cross-linking agent is present, the fibrous base should be subjected to a heat treatment, in order to complete conversion of the cross-linking agent into the thermosetting stage of polymerization. The temperature employed will depend upon the heat-sensitivity of the fibrous base and upon the temperature required to effect such polymerization, and inasmuch as the cross-linking agents are well known materials, these conditions are well known in the art. Ordinarily, temperatures within the range from about 100° to about 300° C are satisfactory. The time required is roughly inversely proportional to the temperature, and will range from about five seconds to about five hours. In any case, the temperatures and heating times are so adjusted as to avoid decomposition or damage either to the finish or to the fibrous base.

EXAMPLE 1

1400 ml of a rinse solution from the bright-dipping of aluminum containing per liter 350 grams of phosphoric acid and 20 grams of dissolved aluminum are stirred and heated to boiling. With continued heating 41 grams of crude North African aluminum phosphate (analysis: $Al_2O_3$ 31, $P_2O_5$ 22.5, Ca 0.9, $Fe_2O_3$ 7, $SiO_2$ 2.5, $TiO_2$ 1.5, moisture 16%) are sprinkled into the boiling solution. Stirring and evaporation of water are continued until the volume of the solution is reduced to 800 ml, at which point the mixture is filtered to remove insoluble impurities and then concentrated to the boiling temperature of 125° C. After cooling to 95° C, 250 grams of urea are stirred in along with 50 mg FC-98 acid-resistant fluorochemical surfactant (3M Co.) and the mixture transferred to a shallow pan in an oven heated at 200° C. The mixture foams on reaching 150° and by 30 minutes of foaming has turned into a friable sponge and can be removed. The yield is 625 g of anionic complex analyzing 54.5% $P_2O_5$, 14.1% N, 7.7% $Al_2O_3$ for a $P_2O_5/Al_2O_3$ weight ratio of 7.1.

EXAMPLE 2

A waste solution from the ion exchange refining of the aluminum-containing rinse phosphoric acid from aluminum bright dipping contains 18 g aluminum and 143 g phosphoric acid per liter. A two liter sample of this waste solution is evaporated to a volume of 900 ml and filtered from excess aluminum phosphate and insoluble impurities and further evaporated until the boiling point of the solution reached 125° C. The solution is cooled to 105° C, 160 grams of urea added and the whole foamed at 235° C for 5 minutes to give 297 grams of readily powdered brittle sponge.

EXAMPLE 3

A waste solution from the ion exchange treatment to recover phosphoric acid values from the acid containing rinses that accumulate in the bright dipping of aluminum contains 15 grams per liter of aluminum phosphate ($AlPO_4$) and 90 grams per liter of phosphoric acid (as $H_3PO_4$). This solution is concentrated to a boiling point of 125° C, cooled to 100° C, mixed with 70 grams of urea and 40 milligrams of FC-95 fluorocarbon surfactant per liter of starting solution, and foamed in a 1 mm thick layer in a shallow pan placed in an air-circulating oven kept at 210° C for 12 minutes. The resulting foam is easily broken up and contains 60.5% $P_2O_5$, 13.9% N, and 5.1 $Al_2O_3$ for a $P_2O_5$ ratio of 12.0. The standard tests for anionic nitrogen and aluminum show that nitrogen and aluminum are present in the anionic portion of the molecule.

EXAMPLE 4

The same solution as in the preceding example is heated as before but with the addition of 9 grams per liter of alumina hydrate. The product obtained contains 59.0% $P_2O_5$, 9.6% $Al_2O_3$, and 13.6% N for an $P_2O_5/Al_2O_3$ ratio of 6.1. The standard tests for nitrogen and aluminum show that nitrogen and aluminum are present in the anionic portion of the molecule.

EXAMPLE 5

The same waste solution as in Example 2 is concentrated to a boiling temperature of 125° C without filtration of excess aluminum phosphate, to give a thick white slush that is noticeably thinned by the addition of 160 grams of urea at 105° C. Foaming for 5 minutes at 235° C gives a readily powdered brittle sponge containing aluminum and nitrogen in an anionic portion of the molecule and cationic aluminum as well. Treatment of the solid with an equal weight of water gives a smooth dispersion of aluminum phosphate in the aqueous solution of the anionic complex.

EXAMPLE 6

The same rinse solution as in Example 1 is passed through a cation exchange column as presented in the paper by T. Korenowski. The purified solution contains per liter 2 g aluminum ion and 295 grams phosphoric acid. A two liter sample of this refined solution is heated to 85°–90° C and evaporated, with maintenance of this temperature by graduul application of vacuum, to a volume of 370 ml. After breaking the vacuum 400 grams of urea is dissolved in the heavy syrup and the resulting solution spread on the tray heated in an air circulating oven at 205° C until the acid number has fallen from the initial value of 630 to 180. A solid, brittle foam is obtained which is soluble in water weight for weight. Tests show that nitrogen and aluminum are present in the anion. The pH of a 2% dilution in water is 6.0.

EXAMPLE 7

A rinse solution from the bright-dipping of aluminum contains per liter 335 grams of $H_3PO_4$ and 17.5 grams of dissolved aluminum. This solution is preheated at 85° C, passed through a falling film evaporator to remove a large part of the water, blended continuously with 220 grams of urea and 25 mg FC-98 fluorocarbon surfactant per liter of starting solution and fed to a double drum dryer preheated to 220° C with the heating of the drums and feed rate of the solution adjusted to have the drum sunfaces always at 200°–210° C and the residence time of the material 15 seconds before falling off the heated surface into a collecting pan as a brittle solid foam containing 51.1% $P_2O_5$, 13.1%N, and 7.0%$Al_2O_3$ for a $P_2O_5/Al_2O_3$ ratio of 7.3. The standard tests for anionic nitrogen and aluminum show that nitrogen and aluminum were present in the anionic portion of the molecule.

EXAMPLE 8 to 10

Solutions or mixtures are prepared each containing 40 parts of water and a total of 60 parts by weight of one or more of the ingredients urea, metaboric acid, and aluminum based anionic complex containing nitrogen and aluminum in the anion according to Example 7. Each blend is brought to 45° C and incubated at this temperature for 4 days and examined for homogeneity, viscosity, and the ability to prevent burning by a match when applied to Whatman No. 1 filter paper at an 8% of dry weight add-on. The results are shown in Table 1.

90%; urea alone, 77%; anionic complex alone, 18%; anionic complex with urea in equal weight proportions, 29%; anionic complex with boric acid (2 to 1 weight), 25%; boric acid and urea (1 to 2 by weight) 75%.

The results of this experiment show the mutual reinforcement action of the essential ingredients of the composition of this invention upon one another in providing surprisingly improved fire prevention.

TABLE 1

| SAMPLE | UREA Grams | BORIC ACID Grams | ANIONIC COMPLEX Grams | HOMO-GENEOUS SOLUTION | VISCOSITY (Centipoise) 25° C | BURNING |
|---|---|---|---|---|---|---|
| Control A | 60 | None | None | Yes | 11 | Yes |
| Control B | None | 60 | None | No | NA* | Yes |
| Control C | None | None | 60 | Yes | 97 | No |
| Control D | 30 | 30 | None | No | NA* | Yes |
| Control E | 20 | None | 40 | Yes | Gel | Yes |
| Control F | None | 20 | 40 | No | NA* | Yes |
| Example 8 | 20 | 10 | 30 | Yes | 72 | No |
| Example 9 | 30 | 5 | 25 | Yes | 48 | No |
| Example 10 | 15 | 15 | 30 | Yes | 81 | No |

NA* = Not Applicable

Examples 8 to 10 illustrate the surprising synergistic effectiveness, economy, and convenience of the compositions according to the invention. Control A while a low viscosity solution is not effective to prevent burning. Controls B, D, and F, are not homogeneous solutions and Controls C and E increase in viscosity rapidly enough to be gelled during the test period.

EXAMPLE 11

A dry chemical type of fire extinguishing composition is prepared according to this invention by sifting together 4.4 kg metaboric acid, 3.6 kg urea, and 3.2 kg. of anionic complex prepared as in Example 3. As oil fire was extinguished by sprinkling with 7.5 kg of this composition for each square meter of burning surface.

EXAMPLE 12

A fire-preventing impregnating solution for 1.8 cm thick ceiling tiles made of sugar can bagasse compressed with a gypsum binder is prepared according to this invention by dissolving in 10 liters of water 2 kg boric acid, 5 kg urea and 4.4 kg of anionic complex prepared as in Example 1. A "vertical extinguishing" rating in the burning test of ASTM D1692 is achieved with a quantity of this solution that provides a 12% dry add-on. Compositions lacking one or more of the essential ingredients according to this invention required the following dry add-on quantities by weight: boric acid along,

EXAMPLES 13 to 18

A series of fire extingusihing concentrates for treating fabrics was prepared by mixing together at room temperature the proportion of the three component composition of anionic complex, boric acid and urea of Example 9, and cross-linking agent shown in Table 2 below. These concentrates are suitable for marketing as a liquid fire extinguishing concentrate for fabrics.

Padding baths were prepared from these concentrates by adding them to water or solutions of a curing catalyst in water. The composition of these padding baths, and pH, are given in Table 2. All padding baths were stable for at least 4 hours.

Table 2

| EXAMPLE NO. | PERCENT ACTIVE INGREDIENTS | PERCENT CATALYST | CROSS-LINKING AGENT | pH |
|---|---|---|---|---|
| 13 | 20 | None | 15% Methylated methylol Melamine1 | 5.6 |
| 14 | 20 | 0.5 ZrOCl$_2$ 8H$_2$O + 0.15% aluminum acetate buffer | 15% Methylated methylol Melamine1 | 5.1 |
| 15 | 15 | None | 5% Dimethylol ethylene urea2 | 5.6 |
| 16 | 18 | None | 5% Methoxy methyl urea resin3 | 5.2 |
| 17 | 18 | 0.5 ZrOCl$_2$. 8H$_2$O + 0.15% aluminum acetate buffer | 5% Methoxy methyl urea resin3 | 4.9 |
| 18 | 12 | None | 10% Formaldehyde | 4.7 |

1 = 75% Aqueous Solution.
2 = 50% Aqueous Solution
3 = 80% Aqueous solution of methoxy methyl urea resin.

A group of five different fabrics was padded with each of these padding baths, with a pad set to give a wet pickup as described in Table 3, after which the fabric was framed, air-dried for 5 minutes at 120° C and then cured for ten minutes at 150° C.

TABLE 3

| FABRIC USED | PAD SET | WET PICKUP |
|---|---|---|
| Cotton 80 × 80 sheeting | 4 | 74% |
| Cotton vat dyed sateen | 3–4 | 62–64% |
| Viscose challis | 4 | 85% |
| Wool flannel | 3 | 70% |
| Nylon taffeta | 2 | 45% |

Fire resistance of the treated fabrics was determined according to the US Department of Commerce Standard DOC FF3-71. Samples of each fabric was then laundered to either 10 to 25 fycles in a "Bendix" auotmatic home washer, using 10 g of "Ivory" soap flakes and 25 g of washing soda, followed by frame drying for 5 minutes at 250° F for each wash cycle, and then retested for fire resistance.

All treated samples passed the test as prepared and after 10 and 25 washing cycles, untreated samples of each fabric failed the test.

The durability of these fire extinguishing finishes on a variety of textiles to laundering is evident.

EXAMPLES 19 to 23

A series of fire extinguishing compositions was prepared by mixing together at room temperature the proportions of the anionic complex, boric acid, and urea according to this invention shown in Table 4 below,

TABLE 4

| EXAMPLE | ANIONIC COMPLEX | GRAMS | UREA GRAMS | BORIC ACID GRAMS |
| --- | --- | --- | --- | --- |
| 19 | Complex of Example 2 | 75 | 17 | 8 |
| 20 | Complex of Example 4 | 45 | 32 | 23 |
| 21 | Complex of U. S. Patent 3,414,374, Example 17 | 55 | 31 | 14 |
| 22 | Complex of U. S. Patent 3,414,374, Example 19 | 62 | 20 | 18 |
| 23 | Complex of Example 6 | 68 | 15 | 17 |

Water solutions were made up containing 22% of the compositions of each of Examples 19 to 23 to serve as applications media according to this invention.

EXAMPLES 24 to 30

A series of padding baths was prepared employing the fire-extinguishing compositions of anionic complex, boric acid, and urea of Examples 19 to 23. To these baths were added the amount of cross-linking agents and catalysts noted in Table 5.

TABLE 5

| EXAMPLE | COMPOSITION OF EXAMPLE NO. | CROSS-LINKING AGENT AMOUNT | CATALYST AMOUNT | pH |
| --- | --- | --- | --- | --- |
| 24 | 19 | 3% Hydroxymethyl-tris phosphine oxide | None | 7.8 |
| 25 | 20 | 4.2% Tris(aziridinyl) phosphine oxide | 0.4% Zinc Fluoborate | 5.3 |
| 26 | 20 | 5% Spiroformal of pentaerythritol | None | 5.40 |
| 27 | 21 | 5% Polyformal of triethylene glycol | None | 4.70 |
| 28 | 22 | 5% glyoxal | None | 5.31 |
| 29 | 23 | 3% Dialdehyde starch | None | 5.40 |
| 30 | 23 | 5% 1,4-bis(glycidyloxy) butane | 0.5% Zinc Fluoborate | 4.2 |

The solutions were applied on a padder at No. 4 setting to blue poplin, dried for 5 minutes at 125° C, and cured for 5 minutes at 160° C.

Resistance to burning according to DOC FF3-71 was determined after laundering in the Easy washer and after dry cleaning with Stoddard Solvent. The laundering test was carried out by washing seven treated samples plus twelve dummy samples in six consecutive washes in the Easy automatic washer, the first five using 20 g of "Ivory" soap flakes, and the sixth with only water. The settings used were "Normal Fabrics", "Small Load", "Hot Wash Temperature", "Warm Rinse Temperature". The temperatures of the washings were 60° C and 58° C.

In the dry cleaning, seven treated samples plus eight dummy samples were dry cleaned, air dried for 1 hour and oven dried for 1 hour at 70° C, and for 5 minutes at 125° C.

All treated samples of Examples 24 to 30, as prepared or after washing or dry cleaning, had char lengths under 25 cm (10 inches) and accordingly passed the burning test.

EXAMPLE 31

A pad bath is prepared containing 27% by weight of the fire extinguishing composition of Example 20 in water. This pad bath is stable for at least 10 days at 28° C.

Cotton 80 × 80 sheeting is padded through this bath, and squeezed to a 70% wet pick-up, run through a hot air oven at 120° C to dry off most of the water, then under a bank of spray nozzles delivering 12% aqueous formaldehyde to a 50% wet pick-up, and finally through a curing oven at 175° C to provide a treated fabric resistant to burning according to DOC FF3-71 as prepared and after ten washing cycles.

EXAMPLE 32

A liquid fire preventing composition for impregnating flammable materials is prepared in accordance with this invention by mixing 50 grams of ionic complex prepared as in Example 5, 25 groups of urea, and 5 grams of boric acid with approximately 45 grams of water to prepare a concentrated solution that exhibits substantially no change in viscosity on keeping at room temperature after removing a small quantity of water insoluble material. Analysis of a sample of the filtrate by evaporation to dryness shows a total solids content of 61.2%.

To the remainder of the solution 4 g triethanolamine is added to act as softener when the composition is used as fire preventing composition on fabric in accordance with this invention.

I claim:

1. A fire extinguishing composition comprising (A) an ionic complex containing in an anionic portion of the molecule complexed nitrogen, phosphorus, oxygen, and aluminum, as evidenced by tests for anoinic nitrogen and aluminum, and having a P:N molar ratio of 10:1 to 2:6, a P:Al molar ratio of 1:1 to 100:1, an acid number less than 400, and a pH in a 2% aqueous solution above 2.5; (B) a boric acid compound selected from the group consisting of orthoboric acid, metaboric acid, and boric anhydride, and (C) urea.

2. A fire extinguishing composition according to claim 1 comprising 30 to 80 parts by weight of the ionic comples, 3 to 40 parts by weight of urea.

3. A fire extinguishing composition according to claim 1 having in the inoic complex a P:N molar ratio of 4:1 to 2:4, a P:Al molar ratio of 3.2 to 10:1, and a pH in a 2% aqueous solution above 5.

4. A fire extinguishing composition according to claim 1 in which the boric acid compound is orthoboric acid.

5. A fire extinguishing composition comprising an alkali metal bicarbonate and composition according to claim 1.

6. A liquid fire extinguishing composition comprising water and a composition according to claim 1.

7. A composition of reduced flammability comprising cellulose and a composition according to claim 1.

8. A composition according to claim 7 including as an additional ingredient a hydroxyalkylamine having from 2 to about 12 carbon atoms, from 1 to 3 amino groups and from 1 to 4 alcoholic hydroxylgroups.

9. A wash-resistant composition of reduced flammability comprising cellulose, a polymerizable cross-linking agent, and a composition according to claim 1.

10. A composition according to claim 8 in which the cross-linking agent is selected from the group consisting of aldehydes, acetals, aldehyde-amine condensation products, xanthydrol compounds, epoxy resin-forming materials, and polymerizable phosphorus compounds.

11. A composition according to claim 8 in which the quantity of polymerizable cross linking agent is from 1 to 200% by weight of the combined quantities of anionic complex, boric acid compound, and urea.

12. A process for preparing an ionic complex containing in an anionic portion of the molecule complexed nitrogen, phosphorus, oxygen and aluminum, as evidenced by tests for anionic nitrogen and aluminum, and having a P;N molar ratio of 10:1 to 2:6, a P:Al molar ratio of from 1:1 to 100:1, an acid number less than about 400, and a pH in a 2% solution higher than about 2.5, comprising the steps of concentrating to at least 700 g $H_3PO_4$ per liter an aqueous solution containing per liter of solution 120 g to 400 g dissolved $H_3PO_4$ and 0.5 g to 30 g dissolved aluminum, adding per liter of concentrate 40 g to 1600 g urea, heating the resulting mixture at 150° to 240° C for 1 to 10000 seconds, and recovering the ionic complex.

13. A process according to claim 11 in which impurities are removed before the addition of urea.

14. A process according to claim 11 including the additional step of adding prior to the addition of urea 10–80 grams/liter of concentrate of an aluminum compound selected from the group consisting of aluminum oxide, aluminum phosphate, and aluminum hydroxide.

15. A process according to claim 11 including the additional step of adding prior to the addition of urea 50–5000 mg/liter of concentrate of an acid-resistant surfactant.

16. A friable solid ionic complex having an apparent density not exceeding 450 grams per liter and containing in an anionic portion of the molecule complexed nitrogen, phosphorus, oxygen, and aluminum, as evidenced by tests for anionic nitrogen and aluminum, and having a P:N molar ratio of 4:1 to 2:4, a P:Al molar ratio of from 3:2 to 10:1, and a pH in a 2% aqueous solution greater than 5.

17. An ionic complex according to claim 15 containing 48 to 52% $P_2O_5$, 12.5 to 15% N, and 4.5 to 11.0% $Al_2O_3$.

* * * * *